United States Patent [19]

Hill

[11] Patent Number: 4,841,561
[45] Date of Patent: Jun. 20, 1989

[54] OPERATING DEFAULT GROUP SELECTABLE DATA COMMUNICATION EQUIPMENT

[75] Inventor: Gregory P. Hill, Naugatuck, Conn.

[73] Assignee: General DataComm, Inc., Middlebury, Conn.

[21] Appl. No.: 129,983

[22] Filed: Dec. 8, 1987

[51] Int. Cl.$^4$ ............... H04M 1/26; H04M 11/00
[52] U.S. Cl. ............................. 379/97; 379/355
[58] Field of Search ............. 379/93, 96, 98, 354, 379/355, 356, 357, 358, 359, 100, 97

[56] References Cited

U.S. PATENT DOCUMENTS

| | | | |
|---|---|---|---|
| 3,885,108 | 5/1975 | Zock | 379/354 X |
| 4,473,720 | 9/1984 | Hegi | 379/355 X |
| 4,741,029 | 4/1988 | Hase et al. | 379/355 X |

Primary Examiner—James L. Dwyer
Attorney, Agent, or Firm—David P. Gordon

[57] ABSTRACT

A modem which is provided with the operating parameters of a plurality of countries and can be made compatible with the country in which the modem is to be used is provided. The universal modem generally comprises: a receiver for receiving signals communicated over a communications channel; a transmitter for transmitting signals out over a communications channel; a ROM for storing the predetermined values of a plurality of operating parameters for a plurality of countries; a non-volatile RAM for receiving and storing in predetermined locations the operating parameters for the country in which the modem is to be used; and a microprocessor connected to the receiver, transmitter, ROM and RAM, for processing received signals and sending relevant information to a data terminal, for obtaining signals from a data terminal, processing the obtained signals, and sending relevent information to the data transmitter, and for obtaining parameter values stored in te RAM thereby permitting the modem to function in accord with the operating parameter requirements of the country in which the modem is to be used. The operating parameters may be software oriented such as the maximum number of redial attempts of a stored number until a first delay, a second delay or forbidden stats is imposed, or hardwar oriented such as the required line impedance.

17 Claims, 6 Drawing Sheets

OPERATING DEFAULT GROUP SELECTABLE DATA COMMUNICATION EQUIPMENT

BACKGROUND

This invention broadly relates to data communication equipment and more particularly to a modem or the like which has built-in compatability with the defined parameters of a plurality of countries.

Data communication equipment (DCE) such as modems are well known and developed in the arts. Indeed, various organizations (e.g. CCITT and Bell) have developed detailed specifications for data communication equipment to establish a certain uniformity and compatability and permit the devices to communicate one with the other. Another aspect of the specifications is the interface of the communication equipment with the communication lines (network) over which data transfers occur, and the use of those lines. With regard to the use of communication lines, it will be appreciated that national and/or local phone companies may have certain specifications or parameters which assume different values in different countries or locales. For example, a telephone pulse dial digit is composed of pulses having a make/break (length of time a signal is generated/length of time no signal is output) combination which is different in different countries. A digit "2" thus generally consists of two consecutive pulses, except, e.g., in New Zealand where reverse pulse dialing is present and a "2" consists of eight (10- 2) consecutive pulses. Also, the pulses must be generated at a fixed rate called "pulses per second" which vary by country. The interval between dialed digits ("interdigit gap") to prevent confusion of digits is also prescribed by the various countries. The make/break ratio, reverse pulse dialing, interdigit gap, and pulses per second are just some of the parameters prescribed differently by different countries which are used to define pulse dialing operation. It will be appreciated that all data communication equipment in the respective countries must be able to generate and recognize the required pulse dialing signals of the particular country of operation. Thus, presently, to accommodate the various differing parameters of the various countries, data communication devices are built with their hardware and software arranged specifically for the country of use. The same DCE which is tailored for use in a first country is therefore not useable in a second country.

SUMMARY OF THE INVENTION

It is therefore an object of the invention to provide a single DCE which may be used in any of a plurality of countries according to the specific parameters of those countries.

It is a further object of the invention to provide a DCE which is usable world-wide and which includes parameter values for desired countries, such that a country selection will cause the DCE to select the proper parameters for the selected country and incorporate those parameters as its default values.

It is another object of the invention to provide a DCE with a ROM containing dialing procedure and automatic redial parameters of a plurality of countries such that the DCE may be programmed by simple command to be compatible for its country of use.

In accord with the objects of the invention, the provided data communication equipment comprises:

receiving means for receiving signals communicated over a communications channel, and transmitting means for transmitting signals out over a communications channel;

a memory means for storing the predetermined values of at least one parameter for a plurality of countries; and processing means connected to the receiving means, the data transmitting means, and the first memory means, the processing means being arranged to process the received signals and send relevant information to a data terminal, to obtain signals from a data terminal, process the obtained signals, and send relevant information to the data transmitting means, and to obtain parameter values from the memory means thereby permitting the processing means to cause the data communication equipment to function in accord with the requirements of the country in which the data communication equipment is being used.

Preferably, the memory means of the DCE of the invention includes a first memory (ROM) where the all parameter values for all countries are stored, and a second memory (non-volatile RAM) which receives and stores in predetermined memory locations the parameter values for the particular country of choice. In this manner, the program which controls the processing means is able to address a particular address in the second memory for a parameter value rather than having to search the first memory for the desired country prior to obtaining the desired parameter. Also, preferably, in one particular embodiment of a DCE (a CCITT V.22bis/V.22 based modem), the parameters for which values are stored by country include: maximum number of redial attempts; number of unsuccessful redial attempts until a delay is imposed; number of unsuccessful redial attempts until a number is forbidden; delay between redial attempts; interdition time; pulse dial make/break ratio; maximum/minimum pulse dial pulses per second; tone dial on period; tone dial off period; reverse pulse dialing; guard tone transmission; and interrupted calling tone transmission. If desired, other parameters such as pulse dial interdigit gap, handshake abort time length, wait period before blind dial, selective cadence/frequency detection of call progress tones including dial tone, busy tone, congestion tone, and ring back tone may also be included. Indeed, if desired, a hardware control parameter may even be included such that, for example, line impedance may be chosen by having the processing means configure the logic level of the hardware or a switching means. Those skilled in the art will appreciate that even other parameters may be software specified if desired. Indeed, reference may be had to Publication No. 000R380-1 *Common GDC Modem Options Reference Book - Standard Nomenclature Description and Usage,* Issue 5, February 1984 for yet additional telephone company specified options.

A better understanding of the invention, and additional advantages and objects of the invention will become apparent to those skilled in the art upon reference to the detailed description and the accompanying drawings.

DETAILED DESCRIPTION OF THE PREFERRED EMBODIMENT

Figure 1:
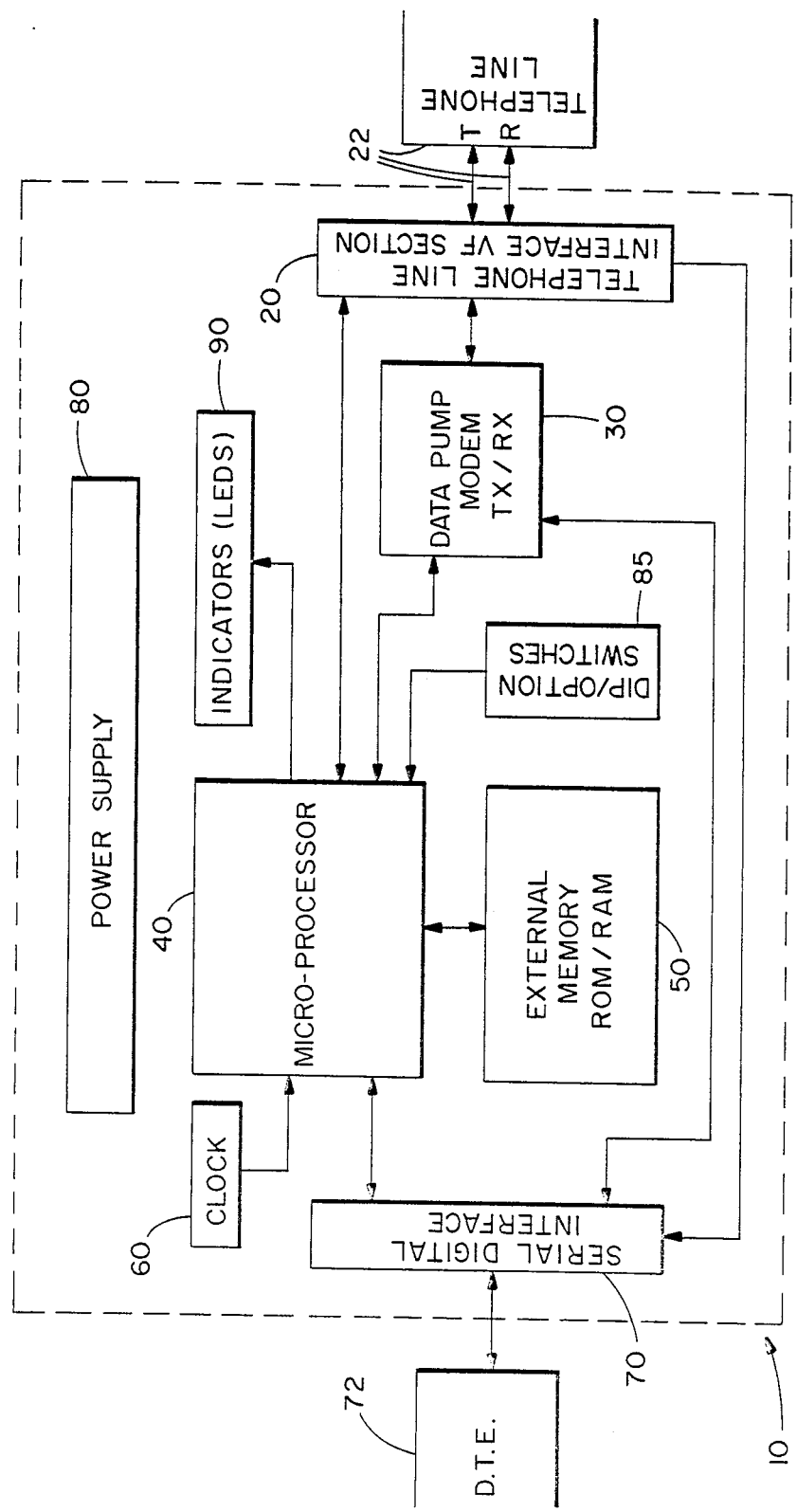
FIG. 1 a block diagram representative of the major components of the preferred data communication device of the invention.

Turning to FIG. 1, the major components of a modem 10 implementing the invention are seen. The modem basically includes a telephone line interface 20 to the telephone lines 22, a data pump 30, a microprocessor 40 and its associated memory 50 and clock 60, a digital interface 70 to data terminal equipment 72, a power supply 80, and option switches 85 and indicators 90. In essence, the microprocessor is the "brains" of the modem and controls the data pump 30, the telephone line interface 20, the digital interface 70, the loading of external memory 50, and the lighting of indicators 90. The actions of the microprocessor are controlled by the data terminal equipment 72 by sending control or command information through the serial digital interface 70, by the option switches 85, and by the execution program located in memory 50.

In operation, data coming from the telephone lines 22 are received at the telephone line interface 20 and converted into proper logic levels for processing by the modem 10. The received data is under the control of the microprocessor 40 which looks for control information and processes the same. Based on the control information, data intended for the data terminal equipment 72 is sent to the data pump 30 where it is demodulated and forwarded via the digital interface (e.g. a V24 or RS232 port) to the DTE 72. If the data is not intended for the DTE 72, but a loop-back is desired, the data is sent back to the telephone line interface 20 where its logic levels are reconverted so as to be compatible with the telephone lines 22.

Where data is originating from the DTE 72, it is received by the modem 10 through the digital interface 70 under the supervision of the microprocessor 40. Control information intended for the microprocessor is read and interpreted by the microprocessor. Data intended for transmittal is forwarded to the data pump under the control of the microprocessor where it is modulated and then sent via telephone line interface 20 out over the telephone lines 22.

As previously indicated, the microprocessor controls the modem 10, but is also controlled by option switches 85 and memory 50. Option switches 85 are hard switches which are used to arrange the modem 10 in a desired manner and to inform the microprocessor of the same. For example, many modems have speed options such as 300, 600, or 1200 baud, and one or two switches can be used to set the same. Also, other options such as asynchronous or synchronous communication mode, asynchronous character length, AT or V.25.bis compatible, and CTS normal or forced on are typically arranged through DIP switches or the like.

The memory 50 of the modem 10 is the reposit of the microcode which dictates the actions of the microprocessor 40 and is typically comprised of at least one ROM and/or a non-volatile (i.e. battery backed up) RAM. According to the preferred embodiment, the memory 50 includes both a ROM and a non-volatile RAM. Included in ROM is not only the standard microcode for governing the operation of the microprocessor of the modem 10 (and hence the modem itself), but a table of values for country-specific parameters according to the specific countries. In the preferred embodiment, at least thirteen different parameters are stored for twenty-one countries plus a reset default set. Included in the parameters are: the number of dialing attempts until a first delay is imposed (f1) and the delay time in minutes (e1); the number of dialing attempts until a second delay time is imposed (f2) and the second delay time in minutes (e2); the maximum number of redial attempts and/or the number of attempts at which a number becomes forbidden (f3); the interdition time in minutes (ggg) which is the amount of time for which a stored number becomes inaccessible as a result of becoming forbidden; the make/break ratio (39/61% and 33/67%); reverse pulse dialing (RPD); dial tone delay (DD) for blind dialing; progress monitoring (PM), where value "2" indicates the enabling of detect dial tone/CPM, value "3" indicates enabling of blind dial/CPM due to the dial tone frequency not being detectable in the specific product application, and value "0" where progress functions are disabled; CCITT V.22/V.22bis or Bell spec handshake (VM); the presence of a calling tone (CALL TN); and the presence of a guard tone (GRD TN). In addition, special cadence detection code (SP CAD) is preferably stored such that, e.g. the non-standard default ringback/busy cadence of Denmark, special dial tones of Italy or Sweden, etc. may be stored. The parameters are preferably stored for the following countries: Australia (AUS); Canada (CAN); China (CHI); Denmark (DEN); France (FRA); Hong Kong (HON); Italy (ITA); Japan (JAP); Korea (KOR); Mexico (MEX); Netherlands (NET); New Zealand (NEW); Norway (NOR); Singapore (SIN); South Africa (SOU); Spain (SPA); Sweden (SWE); Switzerland (SWI); Taiwan (TAI); United Kingdom (UK); and United States (USA). In addition, a default set of values (RES) equal to the United States values are provided.

The table stored in ROM may be represented as follows:

| CTY | E1 | E2 | F1 | F2 | F3 | GGG | 33/67=0 39/61=1 | RPD | DD | PM | VM | CALLTN | GRDTN | SP CAD |
|---|---|---|---|---|---|---|---|---|---|---|---|---|---|---|
| AUS | 1 | 3 | 5 | 6 | 8 | 030 | 0 | 0 | 1 | 3 | 1 | Yes | 1800 | Std def |
| CAN | X | X | X | X | 10 | 000 | 1 | 0. | 1 | 2 | 1 | No | No | Std def |
| CHI | 1 | 2 | 2 | 3 | 5 | 240 | 0 | 0 | 1 | 3 | 1 | Yes | 1800 | Std def |
| DEN | X | X | X | X | 10 | 000 | 0 | 0 | 1 | 2 | 1 | Yes | 1800 | Rgbk bsy |
| FRA | 2 | X | 2 | X | 5 | 060 | 0 | 0 | 1 | 2 | 1 | Yes | 1800 | Std def |
| HON | 1 | 2 | 2 | 3 | 5 | 240 | 0 | 0 | 0 | 2 | 1 | Yes | 1800 | Std def |
| ITA | 2 | X | 5 | X | 9 | 120 | 0 | 0 | 1 | 2 | 1 | Yes | 1800 | Dialtn |
| JAP | X | X | X | X | 2 | 000 | 0 | 0 | 1 | 2 | 1 | Yes | 1800 | Std def |
| KOR | X | X | X | X | 10 | 000 | 1 | 0 | 1 | 2 | 1 | Yes | 1800 | Std def |
| MEX | X | X | X | X | 10 | 000 | 0 | 0 | 1 | 2 | 1 | Yes | 1800 | Std def |
| NET | 1 | 3 | 5 | 6 | 8 | 030 | 0 | 0 | 0 | 2 | 1 | Yes | 1800 | Std def |

-continued

| CTY | E1 | E2 | F1 | F2 | F3 | GGG | 33/67=0 39/61=1 | RPD | DD | PM | VM | CALLTN | GRDTN | SP CAD |
|---|---|---|---|---|---|---|---|---|---|---|---|---|---|---|
| NEW | 5 | X | 1 | X | 10 | 000 | 0 | 1 | 1 | 2 | 1 | Yes | 1800 | Std def |
| NOR | 1 | X | 1 | X | 5 | 000 | 0 | 0 | 1 | 2 | 1 | Yes | 1800 | Busy |
| SIN | 1 | X | 1 | X | 5 | 000 | 0 | 0 | 1 | 2 | 1 | Yes | 1800 | Rgbk |
| SOU | X | X | X | X | 10 | 000 | 0 | 0 | 1 | 2 | 0 | Yes | 1800 | Std def |
| SPA | X | X | X | X | 10 | 000 | 0 | 0 | 1 | 2 | 1 | Yes | 1800 | Std def |
| SWE | 1 | X | 1 | X | 10 | 000 | 0 | 0 | 1 | 2 | 1 | Yes | 550 | Dialtn |
| SWI | X | X | X | X | 10 | 000 | 0 | 0 | 1 | 2 | 1 | Yes | 1800 | Std def |
| TAI | X | X | X | X | 10 | 000 | 1 | 0 | 1 | 3 | 1 | Yes | 1800 | Std def |
| UK | 1 | 2 | 2 | 3 | 5 | 240 | 0 | 0 | 0 | 3 | 1 | Yes | 1800 | Std def |
| USA | X | X | X | X | 10 | 000 | 1 | 0 | 1 | 2 | 1 | No | No | Std def |
| RES | X | X | X | X | 10 | 000 | 1 | 0 | 1 | 0 | 1 | No | No | Std def |

It will be appreciated that where one country shares a set of values with another, only one set of those values is maintained in a particular location in ROM, and all countries sharing those values are referred to the particular location. For example, the United States, and Canada share one set of common values, while Switzerland, Spain, and Mexico share another. It will therefore be appreciated that for the twenty-one countries listed, fewer sets of values need be stored as many value sets are used commonly by more than one country. It will also be appreciated with regard to the parameters themselves that only a single bit might be required to set the parameter value. For example, since two make/break ratios fall within tolerance of the above-listed countries (39/61 and 33/67), a single bit can be used to distinguish between them. Conversely, for some of the parameters, a plurality of bits will be required, as more than two different values are possible.

Figure 2:
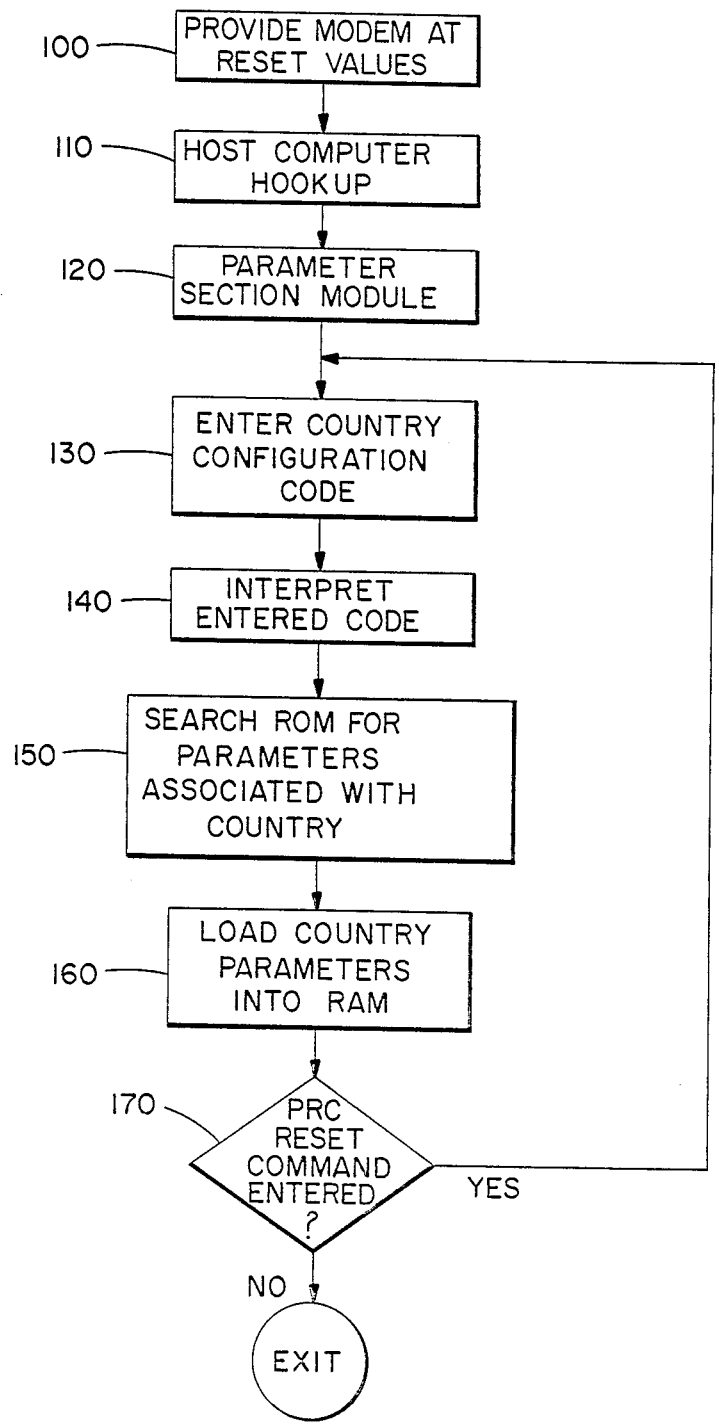
FIG. 2 is a flow diagram of the manner in which the completed data communication device of FIG. 1 is configured upon command of a user to the requirements of a particular country.

As aforementioned, the ROM is preferably the reposit of the data base having the parameter values for the various countries. However, as indicated in the flow chart of FIG. 2, each modem is preferably programmed just once to cause the desired parameter values to be copied into the non-volatile RAM such that access of the desired parameters by the microprocessor is greatly simplified. Thus, the a modem is typically provided at 100 with its default or "Reset" parameter values. When the modem is sent to its destination country, and communication is established with a host computer at 110, upon entering at 120 the parameter selection module of the microcode, the user (e.g. a distributor) is instructed at 130 to enter the program country configuration (PRC) command followed by the first two or three unique letters of the country or by the international dialing prefix of the country. In the preferred embodiment the valid letter (in caps) or number combinations are as follows:

| # | Letter/Country | # | Letter/Country | # | Letter/Country |
|---|---|---|---|---|---|
| 61 | AUS tralia | 81 | JAP an | 27 | SOU th africa |
| 01 | CAN ada | 82 | KOR ea | 34 | SPA in |
| 86 | CHI na | 52 | MEX ico | 46 | SWE den |
| 45 | DEN mark | 31 | NET herlands | 41 | SWI tzerland |
| 33 | FRA nce | 64 | NEW zealand | 886 | TAI wan |
| 852 | HON g kong | 47 | NOR way | 44 | UK |
| 39 | ITA ly | 65 | SIN gapore | 01 | US |

Upon entering the desired letter or number code, the microprocessor interprets the code at 140, searches in ROM at 150 for the parameter values for the country of choice, and loads the parameter values at 160 into predetermined locations in the non-volatile RAM. In this manner, upon needing a parameter value to execute a function, the microprocessor may proceed to a definite location in the RAM to find the desired value rather than having to conduct a search by country and parameter for the particular value. As indicated at 170, the programming of the desired country of choice is not irreversible. Thus, if a wrong value was entered at 130, the user may reset the parameter values (i.e. change the non-volatile RAM values to the "reset" or default values) by entering the command "PRC RESET" followed by a predetermined special six digit code at 170. It is of note that only the "PRC RESET" command followed by the correct code will permit the user to reprogram the country parameter values into the non-volatile RAM by reentering desired numbers or letters at 130. Attempts to override values already in the predetermined locations in non-volatile RAM by entering a new country code at 170 without a previous "PRC RESET" command plus the correct six digit code will be rejected by the microprocessor.

Figure 3A:
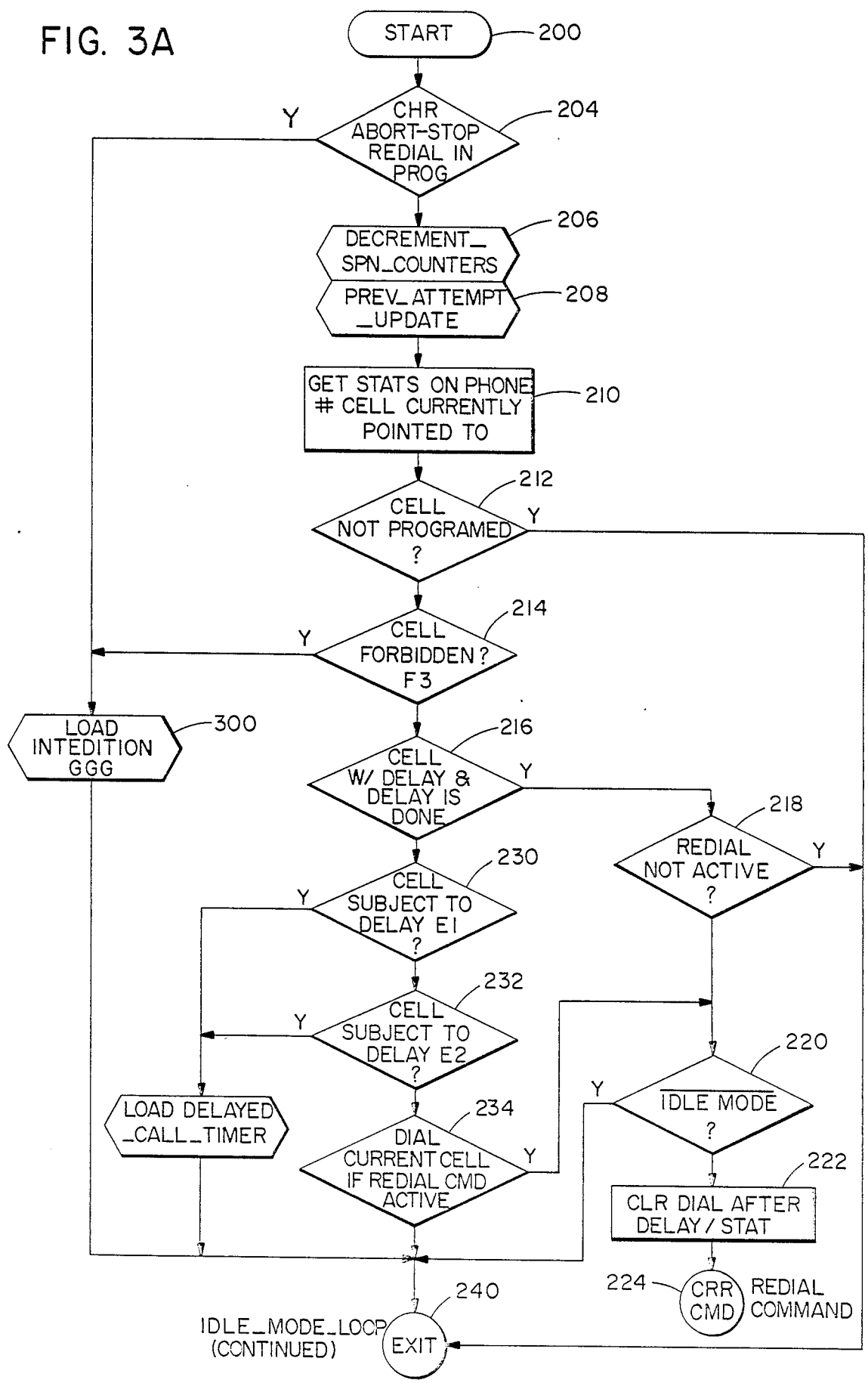
FIGS. 3a-3e are flow diagrams of a section of coded external memory utilized by the microprocessor of the data communication device of FIG. 1 to configure the data communication device according some of the requirements of a particular country.

FIG. 3a represents in flowchart form a section of microcode which controls the automatic redial function of the modem and which therefore must access various of the country parameters. The automatic redial function is a function available on the preferred modem and is supported differently in different countries. The provided modem stores in various memory cells up to ten telephone numbers each up to thirty digits long. In addition, provision for the temporary storage of one telephone number may be supplied. With the provided storage, the user may call a stored telephone number by addressing the appropriate cell number. Each of the stored telephone numbers (or cells storing those numbers) preferably has at least four registers associated with it. The preferred four registers are the "valid stored phone number" (VALIDSPNx) register, the "previous unsuccessful attempt" (PREVATMPTx) register, the "interdition" (INTERDITIONx) register, and the "stored phone number counter" (SPNxCOUNTER) register, where "x" is a variable from one to ten and corresponds to phone number cell one to ten. The VALIDSPNx register is a bit mapped register, with bit "0" indicating whether the stored number in the associated cell is a programmed and valid stored number. Bits "1", "2", and "3" of VALIDSPNx are used to indicate whether the number of attempts to call the stored number in the associated cell exceeds aforedescribed parameters f1, f2 and f3 respectively. Finally, bit "4" is used to indicate that the call delay for the particular phone number has been overridden due to the expiration of the delay.

The PREVATMPTx register holds the number of previous unsuccessful attempts made to connect to a stored number. The register for a cell is incremented for any call failure indication which results from an unsuccessful attempt to dial a number. The PREVATMPTx register for a cell is cleared when a successful connection to the number in that cell is made, when the stored telephone number cell is modified (cleared or overwritten), or when the associated interdition time expires.

The INTERDITIONx register is loaded whenever the number stored in a cell becomes delayed or forbidden, and the register contains a number equal to the amount of minutes (ggg) the modem must wait before the previous unsuccessful attempt register and corresponding delayed or forbidden status bits (see VALIDSPNx) may be cleared. The values stored in the INTERDITIONx registers are decremented each minute, thereby making it possible to determine the elapsed time since the last call attempt which caused the delayed or forbidden status to occur.

The SPNxCOUNTER register is loaded whenever a stored phone number cell becomes delayed, and the register contains a number equal to the amount of minutes (e1 or e2) the modem must delay calling the cell. The values in the SPNxCOUNTER register are decremented each minute.

Turning to the details of FIG. 3a, after entering the automatic redial module at 200, a determination is made at 204 as to whether the user (via the host computer) has caused a redial abort thereby stopping the redial program. If a character abort has been issued from the DTE, the interdition module (of FIG. 3d) is entered at 300. Otherwise, the status counter module is entered at 206 where each minute the counters keeping track of interdition time or dial delay time for particular stored numbers of the memory cells of the modem are decremented (as will be described with reference to FIG. 3b). Then at 208, the previous attempt update module is entered where the current attempt number at dialing a stored telephone number is compared to the permissable values f1, f2, or f3, and checked to see if the number has forbidden status (all as detailed with reference to FIG. 3c). At 210 the status on the phone number cell being dialed (i.e. the contents of the appropriate VALIDSPNx register) is loaded into a register so that the value of the status bits may be determined. If a determination is made at 212 that the addressed cell does not contain a programmed telephone number (i.e. bit "0" has a zero value), the program exits the automatic redial module loop at 240. If the addressed cell does contain a telephone number, a determination is made at 214 as to whether the cell is forbidden due to parameter f3 as afore-described (i.e. check value of bit "3"). If the cell is forbidden, the interdition module is entered at 300. Otherwise, a determination is made at 216 as to whether the cell is a cell which was subject to a delay but which has completed its delay (i.e. check value of bit "4"). If the cell has completed a delay, and the redial request for that number is maintained active (i.e. no DTE activity) as indicated at 218. Then a determination is made at 220 as to whether the idle mode, of which the automatic redial module is part, is active (as opposed to a data mode or a handshake mode). If it is active, a bit (bit "4") used to indicate that the delay was waited at 216 is reset at 222 such that a new delay will be imposed if a future redial attempt is unsuccessful. Then at 224, the dialing function module of the code is entered such that dialing is initiated. If the redial request is not active, or if the idle mode is not active, the program exits the loop at 240.

If a programmed cell not having cell forbidden status and not having completed a delay, then at 230 a determination is made as to whether the cell is subject to the first delay e1 (i.e. check bit "1" of VALIDSPNx). If so, the delayed cell timer module is entered at 350 (details of which are provided in FIG. 3e). If not, a determination is made at 232 as to whether the cell is subject to the second delay e2 (i.e. check bit "2"). If so, again the delayed cell timer module is entered at 350, and if not, if the redial command is active at 234 and the idle mode is active, the dialing function module of the code is entered at 224 such that dialing is initiated. Otherwise, the module is exited at 240.

Figure 3B:
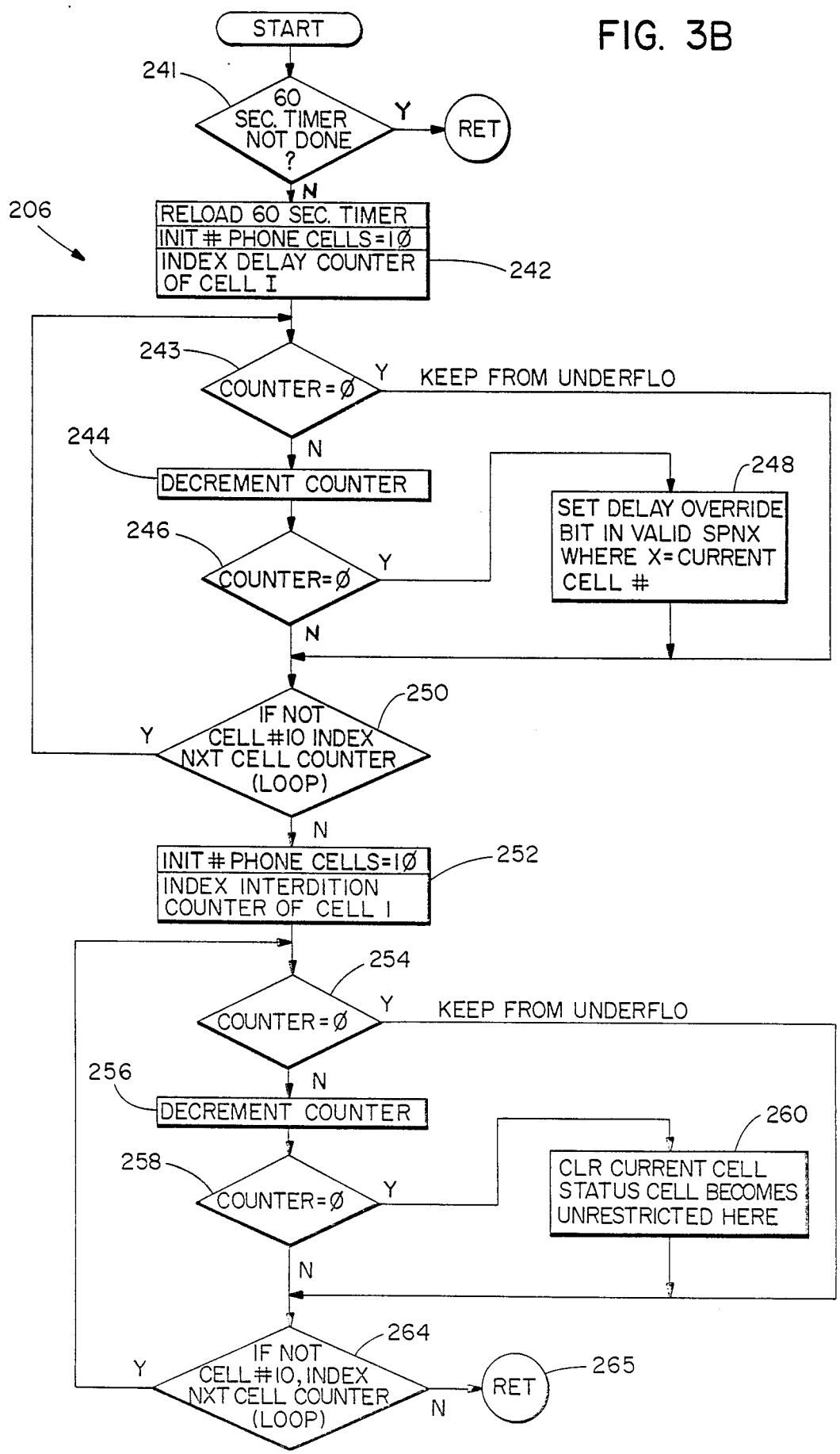

Turning to FIG. 3b, the decrement store phone number counter module flow of step 206 is seen. After starting, a determination is made at 241 as to whether sixty seconds have elapsed since the counters of the module were last decremented. If not, the program is returned to the previous attempt update 208 of FIG. 3a. If sixty seconds have elapsed, at 242 the timer is reset for another sixty second span, the microprocessor is informed that the SPNxCOUNTER registers for the ten cells should be checked, and an index of the particular cell register being checked is set to the register for the first cell (cell 1). If the value of the SPNCOUNTER register for cell 1 is equal to zero as determined at 243, the program continues at 250 and updates the cell register counter index to the next cell. If the counter value is not zero (i.e. a delay for the cell exists), at 244 the value in the cell register is decremented. If, as a result of the decrement, the value of the cell register reaches zero at 246; a bit is set in the VALIDSPNx register at 248 to indicate that the delay has been completed (See FIG. 3a, step 216). Regardless, at 250 the SPNCOUNTER register for the next cell is addressed and steps through the same sequence. After the SPNCOUNTER registers for all ten cells have been reviewed and decremented where called for, the program steps through to step 252 where the number of phone cells is again initialized and the interdition counters of the cells are indexed. If the value of the INTERDITIONx register for cell 1 is equal to zero as determined at 254, the program continues at 264 and updates the cell register counter index to the next cell. If the counter value is not zero (i.e. an interdition time for the cell exists), at 256 the value in the cell register is decremented. If, as a result of the decrement, the value of the cell register reaches zero at 258, the interdition time (INTERDITIONx), the delay times (SPNxCOUNTER), and the previous number of attempts (PREVATTEMPTx) and corresponding delay and forbidden status bits (VALIDSPNx) are all cleared at 260 as the cell becomes unrestricted. Regardless, at 264 the INTERDITIONx register for the next cell is addressed and steps through the same sequence until all the registers which should be decremented have been decremented. Then, at 265, the program returns to step 208 of FIG. 3a.

Figure 3C:
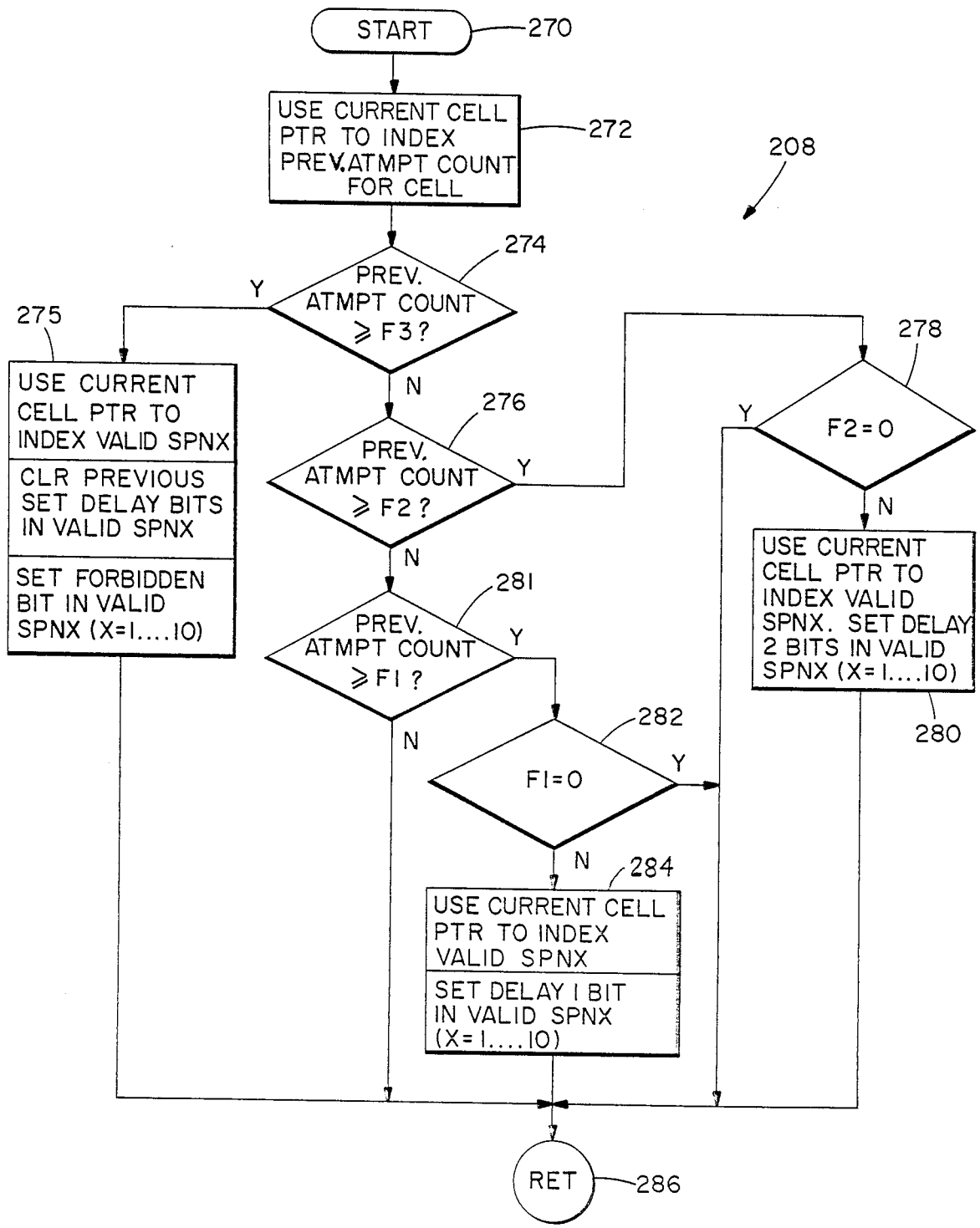

A flow chart of the previous attempt update module of the program is seen in FIG. 3c. After starting at 270, a pointer which shows the last cell number which had an attempted dial is obtained at 272 and is used to index the register (PREVATMPTx) which contains the number of times the dial has been attempted without success. The number contained in the register is then compared at 274 to parameter value f3. If the number in the register equals or exceeds the f3 value, at 275 the phone number becomes forbidden, the delay bits (bits "1" and "2" of VALIDSPNx) associated with the telephone number are cleared, and the bit (bit "3" of VALIDSPNx) indicating a forbidden status is set. The program is then returned at 286 to step 210 of FIG. 3a. If the number of attempts did not equal or exceed the f3 value, it is compared at 276 with the value of f2 (second delay). If it exceeds or equals f2, and f2 is determined at 278 not to be zero, the bit indicating the second delay (bit "2" of the VALIDSPNx register) is set at 280 for the cell in issue. If f2 is determined at 278 to equal zero, the program is returned at 286 to step 210 as no delay will be required.

If the number of attempted calls to a cell number does not exceed or equal the f3 or f2 values, a determination is made at 281 as to whether it equals or exceeds the first delay f1 value. If not, the program is returned at 286 to step 210 of FIG. 3a. If it does exceed or equal f1, and f1 is determined at 282 not to be zero, the bit indicating the first delay (bit "1" of the VALIDSPNx register) is set at 284 for the cell in issue and the subroutine ends at 286 returns to step 210. If f1 is determined at 282 to be equal to zero, the subroutine ends likewise ends at 286 and returns to step 210.

Figure 3D:
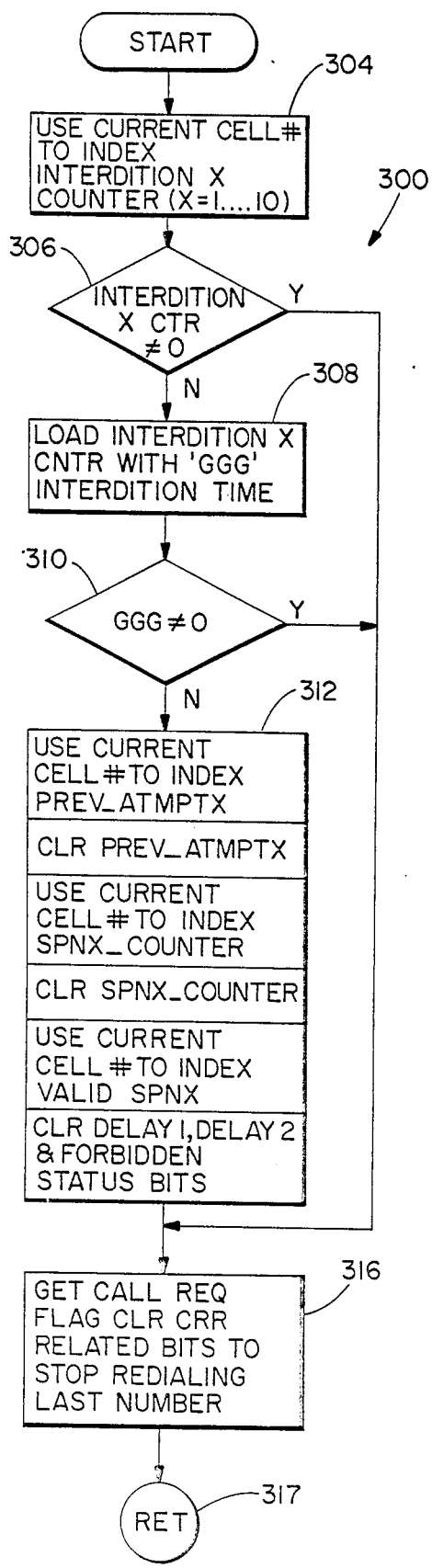

Turning to FIG. 3d where the interdition module is shown, the cell whose number has been most recently dialed (attempted) is used to index the interdition counter register for that cell at 304. If the interdition counter is non-zero at 306, the value of the counter is not changed as it is assumed that an interdition value had already been loaded, and at 316 certain flags and bits in a call request register are set to prevent any redialing of the number. If the interdition counter was zero, the value of the parameter for the country of choice is inserted at 308 into the interdition counter of the cell in issue. If the interdition time parameter is equal to zero (i.e. no forbidden status in the country of choice), the counter for the PREVATMPTx register, the delay counter of the SPNxCOUNTER register, and the delay and forbidden status bits (bits "1"–"3") of the VALIDSPNx register are cleared at 312. The automatic process of redialing is then stopped at 316 by setting the flags and bits as aforedescribed. However, where no forbidden status exists, it is noted that the number may be redialed upon a new command as the number is not subject to interdition or delay. Also, if the interdition time parameter is not equal to zero as determined at step 306, the flags and bits associated with redialing are set appropriately, and the program returns at 317 to FIG. 3a.

Figure 3E:
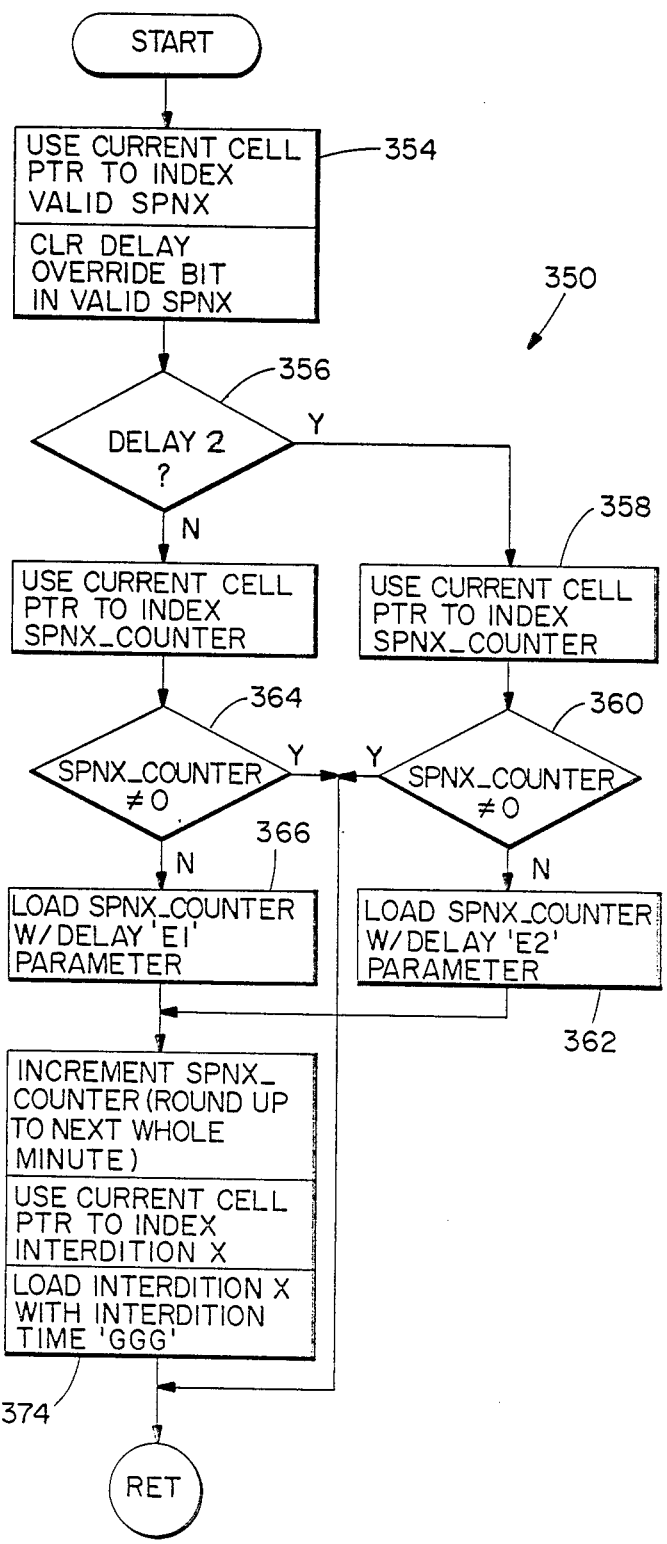

Turning to FIG. 3e, the delayed call timer module is shown. At 354 the bits in the VALIDSPNx register are addressed and the delay override bit (bit 4) is cleared. At 356, bit 2 of the register is tested to see whether the cell is subject to the second delay f2. If it is, and if the value in the delay counter register found at 358 is zero as determined at 360, the value of e2 is loaded into the delay counter at 362. If the cell is subject to the second delay but the delay counter is not zero, it is assumed that the delay is running or previously loaded, and the program continues at step 374.

If the second delay bit (bit 2) is not positively set, the first delay bit (bit 1) is set. Thus, the value in the delay counter register is found at 364. If the value is determined at 366 not to be equal to zero, it assumed that the delay is running or previously loaded and the program continues at step 374. If the value is equal to zero, the value of the e1 parameter for the country of choice is loaded into the delay counter at 366. After the delay counter is loaded at either 362 or 366, the delay counter is incremented by one to ensure that the minimum delay required is accomplished (i.e. the delay counter clock is not necessarily synchronized with the updating of the delay registers, and hence the "first" minute would necessarily not be a complete minute). Also, the cell pointer is used to point to the interdition register which is loaded with the interdition value for the country of choice. The interdition time is loaded so that if the redial of the number is not attempted for the complete interdition time, the values in the previous attempt registers (as well as the delay or forbidden status) are reset.

Those skilled in the art will appreciate that in the automatic redial module of the microprocessor software, various of the above-referenced country parameters which during initialization for the country of choice are downloaded from the ROM and stored in particular accessible locations the non-volatile RAM are accessed. These accessed parameters include the interdition time (ggg), the first delay (e1), the second delay (e2), and the unsuccessful calling attempts before the first delay is imposed (f1), before the second delay is imposed (f2), and before calling is forbidden (f3). Those skilled in the art will therefore appreciate that many other parameters which might vary by country could also be downloaded into non-volatile RAM for easy access by the microprocessor during modem operation. In fact, various other parameters such as the make-/brake ratios, reverse pulse dialing, call monitoring functions, etc., have been aforementioned. However, while the aforementioned and discussed parameters are particularly suited to the provided arrangement where a matrix or chart of parameter values by country are stored and the desired country values are downloaded for easy access by the microprocessor, it will be appreciated that the invention should not be limited to only software related parameters. Thus, for example, the required line impedance for transmission of data over the telephone system may vary by country (Canada requires 900 ohms; the U.S. 600 ohms), and the line impedance may be considered a hardware related parameter. In controlling the same, the parameter would be stored along with the other parameters, however the means for providing the desired line impedance would be hardware. The hardware could either comprise duplicative hardware where the line impedances connected with a first and second transmission port of the microprocessor would be different and the data would be sent out over the desired port n accord with the store parameter. Preferably, however, instead of using duplicative circuitry, control of the impedance may be had via switching or circuit logic such that by raising the logic level of a second port, the logic circuitry connected to the first and second ports could control the line impedance.

Another example of a hardware related parameter that might vary by country is the transmit line signal level. By providing a set of resistors in parallel which could be switched in or out by the microprocessor according to the desired signal level, the transmit line signal level (e.g. 0 to −15 dBm) can be controlled.

There has been described and illustrated herein a data communication apparatus which is usable in a plurality of countries having different operating parameters. While particular embodiments of the invention have been described, it is not intended that the invention be limited thereby, as it is intended that the invention be broad in scope and that the specifications be read likewise. Thus, it will be appreciated that different circuitry could be utilized other than that described herein. For example, other memory means such as (without limitation) an EPROM or a EEPROM could be utilized in lieu of the non-volatile RAM. Also, a single memory means with a first area for storage of all of the parameter values for all of the countries and a second area for storage of the parameter values for the country of choice could be provided and terms such as "first memory" and "second memory" are intended to be interpreted broadly to encompass one or more memory means. Further, those skilled in the art will appreciate that values for many different hardware or software related parameters other than those described could be stored in the memory of the modem and accessed as desired by the microprocessor. In fact, the terms "hardware related parameters" and "software related parameters" should be understood in a liberal sense as the hardware related parameters described herein are actually controlled by software and hence are "hardware/software" parameters. Likewise, various of the "software related parameters" may include hardware implementation depending on the particular product. Therefore, it will be apparent to those skilled in the art that other changes and modifications may be made to the invention as described without departing from the spirit and scope of the invention as so claimed.

I claim:

1. A data communication apparatus for use in a plurality of countries having at least one different operating parameter, comprising:
   (a) receiving means for receiving signals communicated over a communications channel;
   (b) transmitting means for transmitting signals out over a communications channel;
   (c) a memory means for storing the predetermined values of at least one operating parameter including at least one hardware related operating parameter for a plurality of countries;
   (d) means for changing a hardware configuration of said data communication apparatus in accord with said at least one hardware related parameter value; and
   (e) processing means connected to said receiving means, said data transmitting means, said means for changing the hardware configuration, and said memory means, said processing means being arranged
   to process said received signals and send relevant information to a data terminal,
   to obtain signals from a data terminal, process the obtained signals, and send relevant information to said data transmitting means, and
   to obtain parameter values stored in said memory means, said parameter values permitting said processing means to cause said means for changing the hardware configuration to assume a proper configuration so as to permit said data communication apparatus to function in accord with the operating parameter requirements of the country in which said data communication apparatus is to be used.

2. A data communication apparatus according to claim 1, wherein:
   said memory means comprises a first memory for storing the predetermined values of at least one operating parameter for a plurality of countries, and a second memory for storing the predetermined values of at least one operating parameter for said country in which said data communication apparatus is to be used.

3. A data communication apparatus according to claim 2, wherein:
   said at least one operating parameter comprises a plurality of operating parameters, and
   said processing means is further arranged such that
   in a first mode said processing means causes the predetermined values of a plurality of operating parameters for said country in which said data communication apparatus is to be used to be loaded into predetermined locations in said second memory, and
   in a second mode said processing means accesses said predetermined locations in said second memory to permit said processing means to cause said data communication apparatus to operate according to the operating parameters of said country in which said data communication apparatus is to be used.

4. A data communication apparatus according to claim 2, wherein:
   said first memory comprises a ROM and said second memory comprises a non-volatile RAM.

5. A data communication apparatus according to claim 2, wherein:
   said first memory comprises a first set of locations in said memory means and said second memory comprises a second set of predetermined locations in said memory means.

6. A data communication apparatus according to claim 2, wherein:
   said memory means includes a telephone number memory for storing at least one telephone number, and
   said at least one operating parameter comprises the maximum number of redial attempts of a stored number until a first delay is imposed, the maximum number of redial attempts of a stored number until a second delay is imposed, and the maximum number of redial attempts of a stored number until further calling is forbidden.

7. A data communication apparatus according to claim 6, wherein:
   said at least one operating parameter further comprises a first delay time, a second delay time, and an interdition time.

8. A data communication apparatus according to claim 7, wherein:
   said at least one operating parameter comprises a pulse dial make/break ratio, and the tone dial on and off periods.

9. A data communication apparatus according to claim 1, wherein:
   said means for changing the hardware configuration comprises means for changing the line impedance of said data communication apparatus, wherein
   said at least one hardware related operating parameter comprises line impedance.

10. A method for establishing the compatibility of a modem with the requirements of its country of intended use, said modem comprising a receiver for receiving signals communicated over a communications channel, a transmitter for transmitting signals out over a communications channel, a memory means for storing the predetermined values of a plurality of operating parameters including at least one hardware related parameter for a plurality of countries, a means for changing the hardware configuration of the modem, and a processing means connected to the receiver, transmitter, the means for changing the hardware configuration, and the memory means, for processing received signals and sending relevant information to a data terminal, for obtaining signals from a data terminal, processing the obtained signals, and sending relevant information to the data transmitter, and for controlling the changing of the hardware configuration in conjunction with said means for changing the hardware configuration, said method comprising:

(a) causing said processing means to access said memory means and obtain said values of said plurality of operating parameters for said country of intended use;

(b) loading said obtained values of at least one of said plurality of operating parameters for said country of intended use into predetermined locations in said memory means such that during operation of said modem said values in said predetermined locations are accessed by said processor to permit said modem to operate according to the requirements of said country of intended use; and (c) using said at least one hardware related operating parameter to cause said means for changing the hardware configuration to change the hardware configuration of said modem to permit said modem to operate according to the requirements of said country of intended use.

11. A method according to claim 10, wherein:
said memory means comprises a ROM in which said values for said at least one of said plurality of operating parameters for said plurality of countries is stored, and a non-volatile RAM into predetermined locations of which said obtained values are loaded.

12. A method according to claim 11, wherein:
said memory means includes a telephone number memory for storing at least one telephone number, and said at least one of said plurality of operating parameters comprises the maximum number of redial attempts of a stored number until a first delay is imposed, the maximum number of redial attempts of a stored number until a second delay is imposed, and the maximum number of redial attempts of a stored number until further calling is forbidden.

13. A method according to claim 12, wherein:
said at least one of said plurality of operating parameters further comprises a first delay time, a second delay time, and an interdition time.

14. A method according to claim 11, wherein:
said at least one of said plurality of operating parameters further comprises a pulse dial make/break ratio, and the tone dial on and off periods.

15. A method according to claim 10, wherein:
said at least one hardware related operating parameter comprises at least line impedance.

16. A data communication apparatus according to claim 1, wherein:
said means for changing the hardware configuration comprises means for changing the transmit line signal level of said data communication apparatus, wherein said at least one hardware related operating parameter comprises transmit line signal level.

17. A method according to claim 10, wherein:
said at least one hardware related operating parameter comprises transmit line signal level.

* * * * *